F. PELZER.
Improvement in Clip-Drum.
No. 132,099.    Patented Oct. 8, 1872.
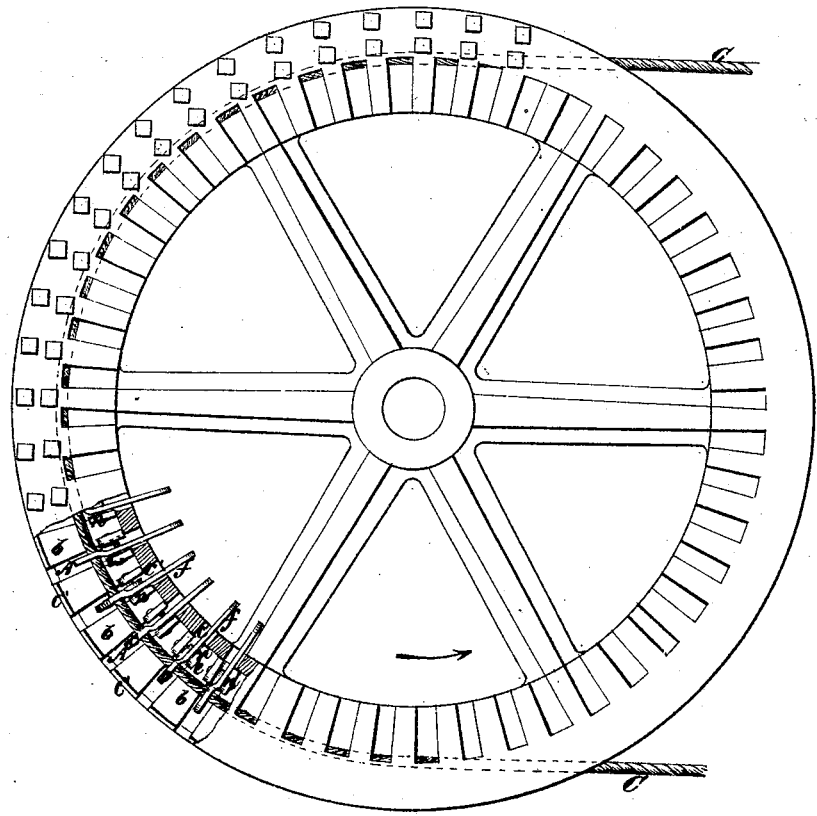
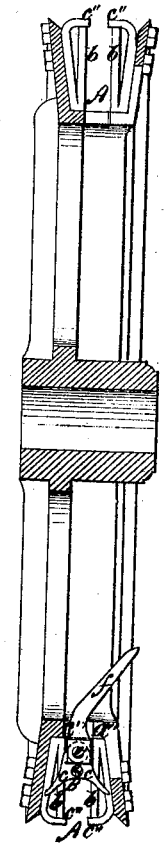

UNITED STATES PATENT OFFICE.

FREDERIC PELZER, OF KOHLSCHEID, RHENISH PRUSSIA.

IMPROVEMENT IN CLIP-DRUMS.

Specification forming part of Letters Patent No. 132,099, dated October 8, 1872.

*To all whom it may concern:*

Be it known that I, FREDERIC PELZER, of Kohlscheid, in Rhenish Prussia, have invented an Improved Clip-Drum, of which the following is a specification:

This invention relates to that class of apparatus known as clip-drums and used for transmitting power through ropes passing over only a portion of their peripheries and urged in their movement by the action of clips or griping devices, peripherically applied to the drum. The invention consists in a novel griping device, so applied to the drum that the rope is automatically released at that point where it leaves the drum and securely griped where it approaches the drum, without any of of the catching or continued hold of such devices upon the rope, which otherwise would exert a strain upon the same extremely detrimental to the efficient transmission of power and the durability of the rope.

Figure 1 is a side view and partial section of a clip-drum made according to my invention. Fig. 2 is a central transverse section of the same taken in a plane at right angles to Fig. 1.

The body of the drum, of cast metal or other suitable material, may be made in two sections, bolted together and so shaped that a groove, A, narrower at its bottom than at its top, forming inclined sides, is formed in the circumference thereof. At regular intervals upon the opposite sides of this groove or circumferential recess are arranged radial guides $b$ of wrought-iron and firmly bolted in place. Between these guides $b$ work the clips or griping devices B, the tongues $f$ of such clips projecting inward through openings $c'$ provided in the bottom of the groove coincident with the spaces occupied by the clips, as just set forth. Each clip consists of two jaws or gripers, $c$, pivoted together, at $e'$, upon a sliding block, $n$, and each formed with a semicircular recess, and in such manner that, the two recesses being opposite each other, the rope is situate therein while being acted upon by the clip. The inner end of one of the jaws $c$, extended from the tongue $f$, is bent or curved laterally, as shown in Fig. 2. It will be observed that the clips, with their blocks $n$, which serve as carriers to them, are capable of free radial movement between the guides $b$, and that the groove A is of such depth as to permit the radial play of the clips through a length of, say, twice the length of the jaws $c$. When the clips are forced inward, as by the pressure of the rope C upon them, the inclined sides of the groove A force the jaws together with a griping action, when a reverse movement, (as by their own weight, when brought to the lowermost part by the rotation of the drum or or by suitable mechanical appliances, the inclined outer surface of the tongue $f$ of the clip coming in contact with the bearing-surface provided by the edge $a''$ of the opening $c'$,) causes the jaws to open or spread apart. The clips are prevented from falling out of their places, when brought undermost, by the revolution of the drum, by projections $c''$ extending inward from the outer extremities of the guides $b$, as represented in Fig. 2. The rope C, passing around one-half of the circumference of the drum, is so arranged that a sufficient tension is exerted upon it to press it inward upon the clips B, (the rope being at this part of the drum situate within the semicircular recesses of the clips.) By this means the clips are operated to gripe the rope, as herein previously explained, and motion is given to the rope proportioned to the speed of the drum, and power in a ratio corresponding to the gripe of the clip upon the rope. Motion being given to the drum, for example, in the direction indicated by the arrow in Fig. 1, the clips, moving outward or downward by their own weight, are opened by the operation of the tongues $f$, as previously described, and the rope passes into the requisite position between the jaws thereof freely and without any catching or dragging action that otherwise would be likely to interfere therewith. As the rope leaves the drum at the opposite side the clips, having a free radial movement, follow the motion up the rope, as concerns its increase of distance from the axis of the drum, until the tongues $f$, being made to act on the edges $a''$ of the openings $c'$, open the jaws and cause the latter to release the rope without any dragging or catching action upon the rope, which would tend to deviate from a tangential line with reference to the drum, and thereby produce loss of power; and, in accuracy of operation, when desired, each of the jaws of the clips may have a tongue, $f$, arranged in any way, or in connection with any suitable appliances to produce the effect set forth.

What I claim as my invention is—

The clip constructed with the tongue $f$ arranged in relation with the edge or bearing-surface $a''$, and capable of a radial movement between guides provided in the groove A of the clip-drum, substantially as and for the purpose set forth.

F. PELZER.

Witnesses:
 D. URRER,
 JOS. SCHROIFF.